United States Patent [19]

Johnson

[11] Patent Number: 5,685,994
[45] Date of Patent: Nov. 11, 1997

[54] METHOD FOR WATER TREATMENT AND PURIFICATION USING GAS ION PLASMA SOURCE AND DISINFECTANT METAL ION COMPLEXES

[76] Inventor: Dennis E. J. Johnson, 8530 Windfall Way, Black Forest, Colo. 80908

[21] Appl. No.: 627,277

[22] Filed: Apr. 4, 1996

Related U.S. Application Data

[63] Continuation-in-part of Ser. No. 326,339, Oct. 20, 1994.

[51] Int. Cl.$^6$ ............................................. C02F 1/32
[52] U.S. Cl. .................. 210/748; 210/752; 210/758; 210/764; 205/752; 205/756; 205/760; 250/431; 250/435; 422/23; 422/29
[58] Field of Search .................. 204/293; 205/752, 205/756, 760; 210/748, 764, 192, 198.1, 199, 205, 223, 243, 752, 758; 250/431, 435, 438; 422/22, 24, 29, 186.07, 186.1, 186.12, 186, 15, 186.3

[56] References Cited

U.S. PATENT DOCUMENTS

| | | | |
|---|---|---|---|
| 992,980 | 5/1911 | Patin | 210/748 |
| 3,186,929 | 6/1965 | Rippie | 204/155 |
| 3,697,420 | 10/1972 | Blaisdell et al. | 210/695 |
| 4,094,783 | 6/1978 | Jackson | 210/97 |
| 4,128,788 | 12/1978 | Lowther | 315/176 |
| 4,238,326 | 12/1980 | Wolf | 210/695 |
| 4,343,707 | 8/1982 | Lucas | 210/695 |
| 4,382,866 | 5/1983 | Johnson | 210/748 |
| 4,492,618 | 1/1985 | Eder | 204/152 |
| 4,562,014 | 12/1985 | Johnson | 261/76 |
| 4,563,286 | 1/1986 | Johnson et al. | 210/721 |
| 4,640,782 | 2/1987 | Burleson | 210/764 |
| 4,655,933 | 4/1987 | Johnson et al. | 210/721 |
| 4,752,401 | 6/1988 | Bodenstein | 210/764 |
| 4,781,805 | 11/1988 | Dahlgren et al. | 205/760 |
| 4,857,204 | 8/1989 | Joklik | 210/695 |
| 4,936,979 | 6/1990 | Brown | 210/192 |
| 4,956,080 | 9/1990 | Josefik | 210/109 |
| 5,013,417 | 5/1991 | Judd, Jr. | 204/228 |
| 5,192,423 | 3/1993 | Duczmal et al. | 209/164 |
| 5,368,705 | 11/1994 | Cassidy | 204/293 |
| 5,443,719 | 8/1995 | Johnson et al. | 210/101 |

FOREIGN PATENT DOCUMENTS

| | | | |
|---|---|---|---|
| 478770 | 7/1929 | Germany | 210/223 |
| WO8102685 | 10/1981 | WIPO . | |

*Primary Examiner*—Peter A. Hruskoci
*Attorney, Agent, or Firm*—Michael de Angeli

[57] ABSTRACT

A system for disinfecting water streams comprises a source of ionized plasma, that is, a stream of air including ionized oxygen and nitrogen gas atoms and molecules, ozone, and singlet molecular oxygen, and an additional source of metal ions. The gas plasma is introduced into the water stream upstream of the metal ion stream to produce a variety of oxidizing, coagulating, and disinfecting reactions. Further, the metal ions combine with the gas ions to form additionally known disinfectant compounds. The source of ionized gas molecules is an ultraviolet lamp driven at very high frequency by a pulsated signal and optionally juxtaposed to a coil providing electric and/or magnetic fields, to excite and ionize oxygen and nitrogen molecules of the air. The metal ions are provided by sacrificial electrodes comprising alloy members of the metal elements to be provided to the water stream. A DC potential applied to the electrodes is uniformly reversed at intervals, to encourage sacrificial erosion thereof. The system may be provided as a retrofit disinfectant, coagulation, and purification plant for swimming pools or like closed loop domestic or industrial water systems, or used for non-chemical treatment of drinking water and/or non-chemical purification treatment for environmental water purification and safe discharge applications, replacing chlorination and other conventional chemical coagulation treatments.

18 Claims, 4 Drawing Sheets

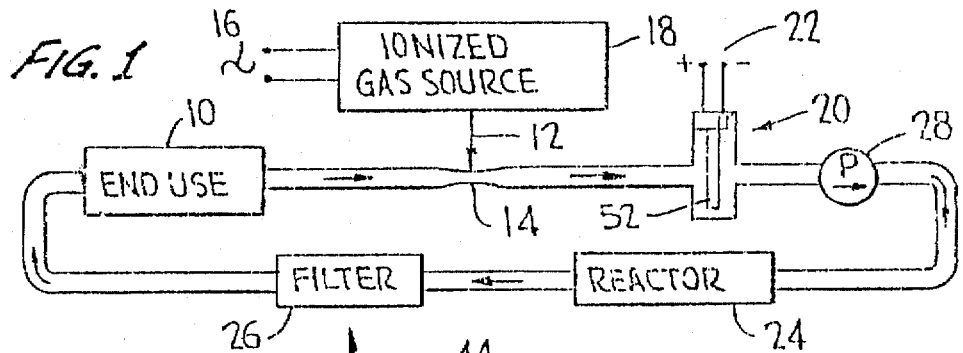
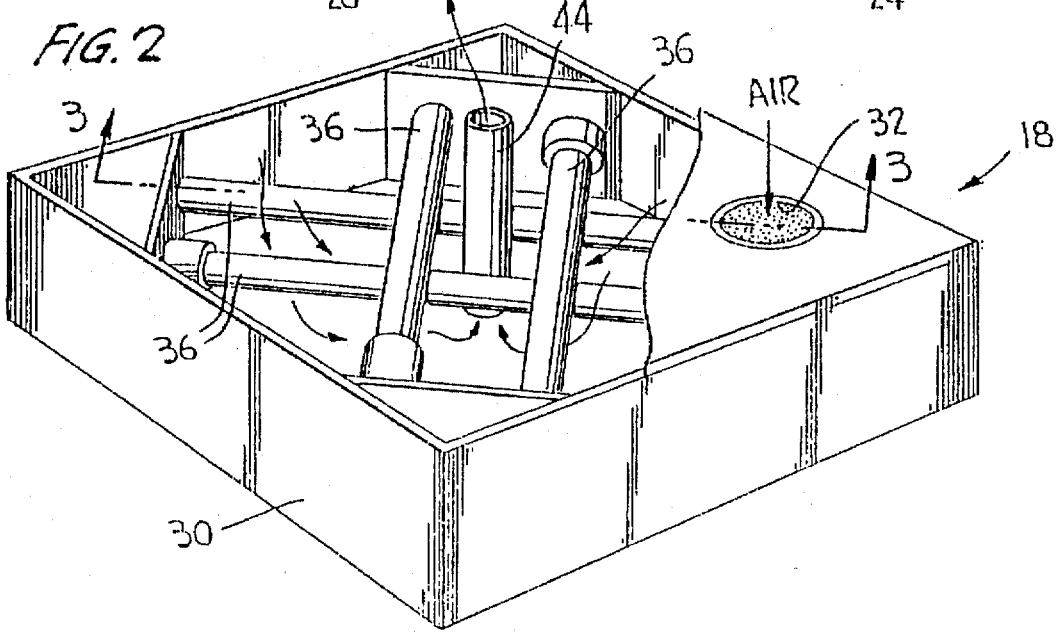
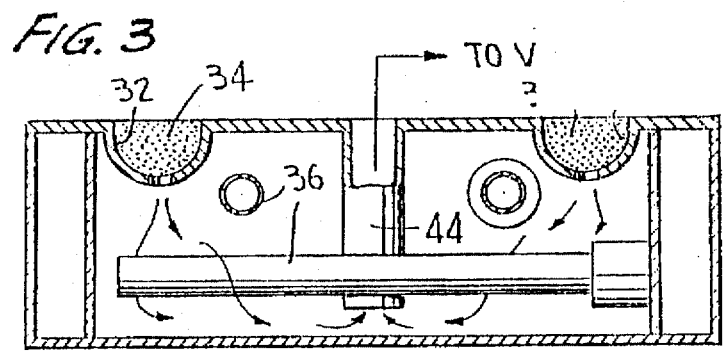
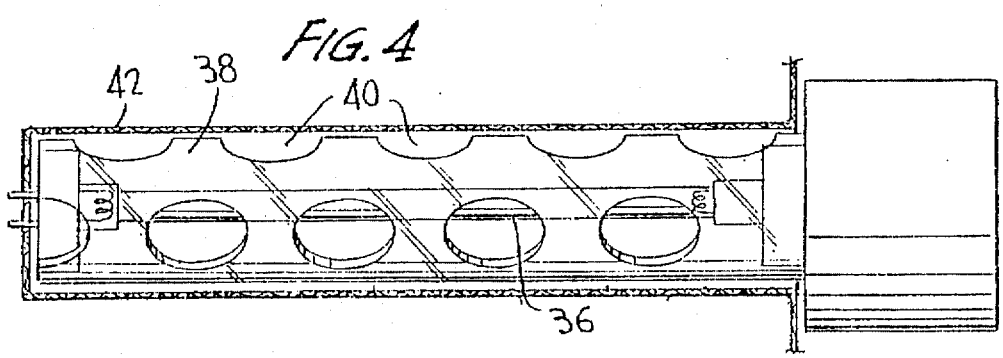

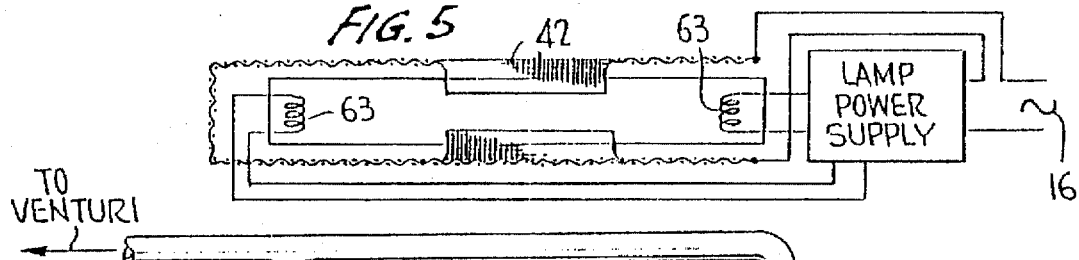
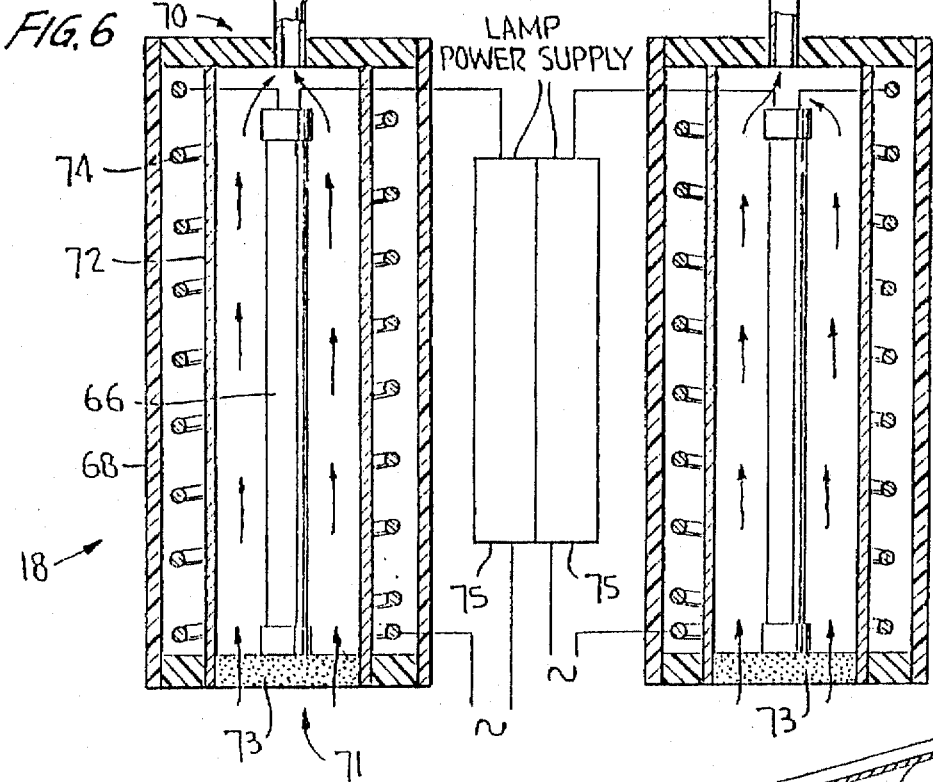
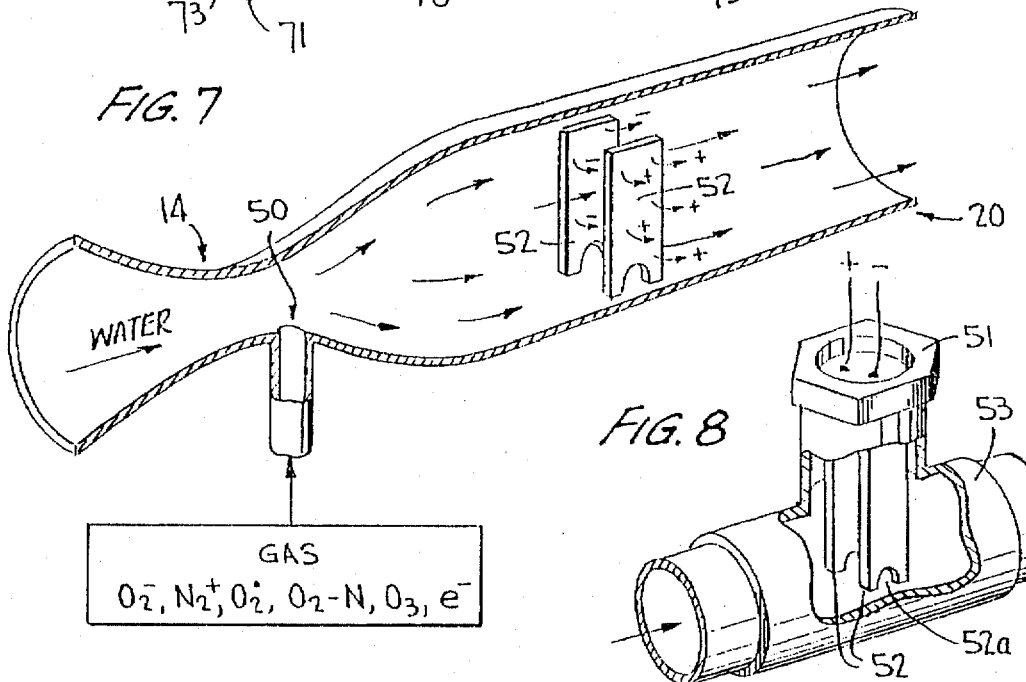
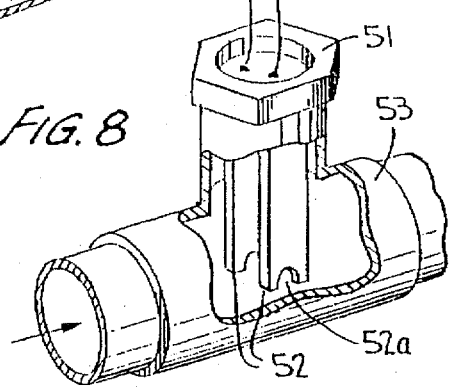

METHOD FOR WATER TREATMENT AND PURIFICATION USING GAS ION PLASMA SOURCE AND DISINFECTANT METAL ION COMPLEXES

CROSS-REFERENCE TO RELATED APPLICATIONS

This application is a continuation-in-part of Ser. No. 08/326,339, filed Oct. 20, 1994.

FIELD OF THE INVENTION

This invention relates to apparatus and methods for treating contaminated water while avoiding conventional chemical treatments. More particularly, the invention provides methods and apparatus for oxidizing and coagulating contaminants in water, followed by their removal, thus disinfecting the water, while avoiding the introduction of large quantities of toxic chemicals such as chlorine or polymeric chemical coagulants into the water stream.

BACKGROUND OF THE INVENTION

The treatment of water to kill biological contaminants, such as algae, bacteria, viruses, and the like, and to coagulate and remove these pollutants, as well as non-biological particulates, contaminant metals, and the like, and in particular, to disinfect water for drinking or to "decontaminate" water for safe environmental discharge, has a long history. Nonetheless, the practice of water treatment continues to evolve as new discoveries are made.

Typical prior practices comprise addition of chlorine to the water stream, to kill bacteria, algae, viruses, and the like, along with addition of anionic or cationic polymeric coagulants. Electrostatic interaction between the contaminants and the coagulants tends to coagulate the contaminants into particles large enough to be removed by filtration or settling.

As of the filing of this application, it appears very likely that the practice of chemical chlorination, long the preferred method of disinfecting drinking, industrial, commercial, and swimming pool water streams and the like, will soon be banned or severely restricted due to toxicity of chlorine compounds and environmental pollution caused by their use.

Accordingly, a substantial need exists for methods of removing contaminants from water avoiding chlorine or other chemicals thought to be toxic. More specifically, a need exists for methods of water treatment and disinfection not involving introduction of chlorine or additional toxic and hazardous chemical treatment substances into the water stream.

Preferably, any water treatment method replacing chlorination and other chemical treatment would be economically practiced, and apparatus for its practice would be available as a unit for retrofitting systems now employing chlorination and chemical treatment, such as swimming pool disinfecting systems, commercial drinking water processing plants, and/or industrial wastewater treatment systems. In this connection, while the present invention is described herein primarily as a replacement for chlorination and chemical treatment in connection with swimming pool, drinking water, and/or industrial water streams, and the like, the present invention may find application in many other water streams where purification and disinfection must be accomplished without chemical and/or coagulant treatments.

The present inventor has been working in the field of purification of contaminated water systems without employment of chlorine and chemical treatments or the like for some years. See U.S. Pat. Nos. 4,562,286 and 4,655,933 to the present inventor and Scott J. Johnson. These patents both recognize that a water stream can be purified by introduction of ionized oxygen tending to oxidize various pollutants, and teach further that ionized oxygen can be produced by exposing atmospheric air to ultraviolet light, particularly in the presence of permanent magnets.

U.S. Pat. No. 4,562,014 to the inventor herein discloses a system for introducing oxidant gases such as ionized oxygen into a water stream. A venturi is employed for dispersing the gas in the liquid stream; thorough mixing of the gas and liquid streams is encouraged by the drop in pressure after the venturi. The teachings of this patent are employed in the present invention, as will be apparent from the discussion below.

U.S. Pat. No. 4,382,866, also to the present inventor, shows a system for performing electrochemical filtration to remove flocculated or coagulated pollutants from a contaminated water stream.

U.S. patent application Ser. No. 08/200,749, now U.S. Pat. No. 5,443,719, in the name of the present inventor and another, and copending with the parent Ser. No. 08/326,339, discloses further improvements in the removal of contaminants from water streams by encouraging flocculation thereof, such that physical separation is then possible. The teachings of U.S. Pat. No. 5,443,719 may be employed together with the teachings of the present invention where the nature of the contaminated water stream indicates that both techniques may be of use.

OBJECTS OF THE INVENTION

It is therefore an object of the invention to provide a system for removal of pollutants, impurities, organics, and other undesirable components of a water stream, avoiding addition of significant quantities of chlorine and/or other toxic or undesirable foreign chemical treatment components into the water stream.

It is a further object of the invention to provide a system for the treatment of water wherein disinfectant and coagulating compounds are formed by reaction in situ, greatly increasing the efficiency of production and employment of such synthesized disinfecting and coagulating compounds.

It is a further object of the invention to provide an apparatus for treatment of water for certain specified process streams, such as swimming pool filtration and disinfection water streams, drinking water filtration and disinfection water streams, and/or industrial wastewater streams, and which can be retrofit as a direct replacement for preexisting chlorination or like chemical treatment equipment.

SUMMARY OF THE INVENTION

The above objects of the invention and needs of the art, and others which will appear as the discussion below proceeds, are satisfied by the present invention, which in a typical embodiment comprises a source of oxygen and nitrogen ion molecules, as well as increased quantities of paramagnetic oxygen molecules, thus producing a stream of ionized plasma from the air, a source of a stream of ionized metal atoms such as copper, silver, and stannous atoms, a source of free electrons, and means for mixing the streams of ionized gas, electrons, and ionized metal atoms with the water stream to be treated. The result is that known disinfectant compounds such as the algicide copper nitrate ($Cu^+NO^-_3$), the bactericide silver nitrate ($Ag^+NO^-_3$), and the viricide and fungicide stannous tartrate ($Sn^{++}C_4H_4O^{--}_6$), are produced in situ, at high efficiency. Accordingly, algae, bacteria, viruses, and fungi are destroyed by biocidal compounds formed directly in the water stream. The fact that ions are added to the water stream in quantity encourages electrostatic attraction of the various contaminant components and their coagulation, allowing removal by settling or filtration.

In a preferred embodiment, a plasma, that is, a stream of ionized gas molecules, is produced by exposing a stream of atmospheric air to a lamp emitting both ultraviolet and infrared radiation, while providing one or both of electric and magnetic fields in the vicinity of the lamp. Preferably, the lamp drive current is pulsated periodically; also preferably, conditions are such that free electrons are provided as well. The stream of air, including a substantial plasma fraction of paramagnetic oxygen, ionized oxygen and ionized nitrogen gas molecules, as well as free electrons released by ionization of nitrogen atoms, is introduced into the water stream by connecting the exposure chamber in which the plasma is formed to an area of low pressure in the water stream, typically formed by a venturi through which the water stream passes.

Metal ions are added to the water stream, having had the ionized gas molecules introduced thereto, by passing the stream between electrically charged sacrificial electrodes comprising atoms of the metal ions to be added. In a preferred embodiment, the electrodes may simply be cast of a mixture of stannous, copper, and silver metals in the desired proportions. A DC voltage, the polarity of which is alternated at intervals on the order of one or several minutes, is applied across the electrodes, so that an electric field exists therebetween, causing sacrificial decomposition of the electrodes, and providing further energy driving the desired reactions. Ionized metal atoms are detached from the electrodes and entrained in the water stream, for immediate synthesis reaction with the ionized molecules of oxygen and nitrogen entering from the stream of air. The result is that various coagulant and disinfectant compounds are formed in situ in the water, tending to coagulate and disinfect the various contaminant constituents of the water stream to be treated. The water stream may then be recirculated in a reactor tank for a period on the order of minutes, to ensure substantially complete coagulation and/or disinfection, and is then filtered to remove the killed organics as well as any coagulated particulates, flocculated solids, or other debris.

BRIEF DESCRIPTION OF THE DRAWINGS

The invention will be better understood if reference is made to the accompanying drawings, in which:

FIG. 1 shows a block diagram of an overall system for non-chemical treatment of water according to the invention;

FIG. 2 shows a perspective view of a first embodiment of an ionized gas source for providing a stream of ionized gas atoms;

FIG. 3 shows a cross-section taken along the line 3—3 of FIG. 2;

FIG. 4 shows an enlarged view of an assembly of an ultraviolet lamp and coil used in one embodiment of the ionized gas source according to the invention;

FIG. 5 shows a schematic diagram of circuitry supplying the ultraviolet lamp and coil with electrical power;

FIG. 6 is a cross-sectional view through two identical assemblies of a second embodiment of an ionized gas source, again comprising a coil surrounding an ultraviolet lamp in an exposure chamber;

FIG. 7 shows a perspective cutaway view of a portion of the system, illustrating the venturi at which the ionized gas stream is added to the water stream, and the electrodes whereby metal ions are added to the water stream for reaction with the ionized gas atoms;

FIG. 8 shows a preferred construction of the ion addition system of FIG. 7;

FIGS. 9–11 show a further embodiment of the unit for producing a stream of ionized gas molecules wherein:

FIG. 9 shows a perspective, partly cutaway view,

FIG. 10 shows a cross-sectional view through a reactor cylinder duct, ultraviolet lamp, and magnetic field applying coil, and FIG. 11 shows a plan view, and FIGS. 12–14 show a further embodiment wherein:

FIG. 12 is a perspective view,

FIG. 13 is a partially cutaway plan view, and

FIG. 14 is a section along line 14—14 of FIG. 13.

DESCRIPTION OF THE PREFERRED EMBODIMENTS

Figure 9:
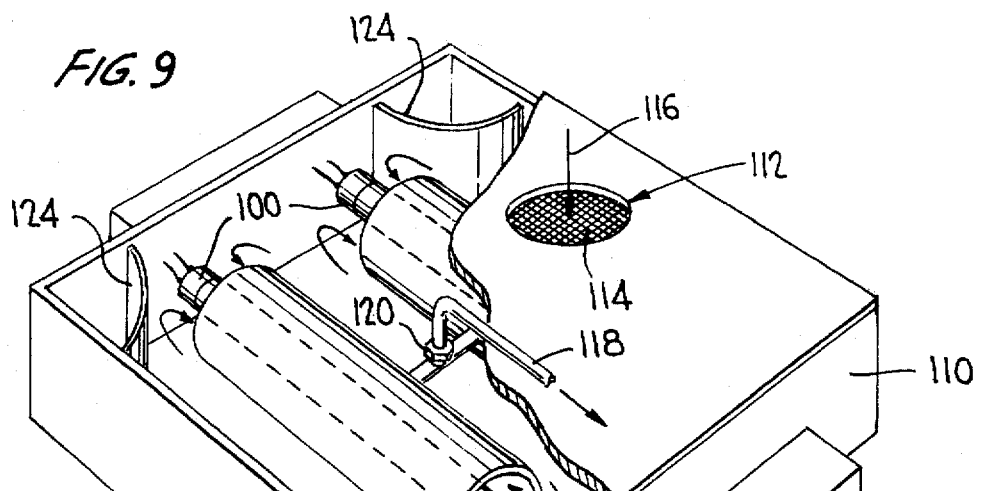

FIG. 1 depicts an overall block diagram view of a typical closed-cycle water system including water treatment according to the invention, such as environmental decontamination treatment, swimming pool water disinfection systems, industrial water treatment systems, and the like. As indicated above, the invention may find significant initial wide-spread use in replacement of presently existing chlorination and chemical coagulation and purification plants for swimming pools, and the invention will be described in that environment. However, it should be appreciated that the invention has use in treatment of many other sorts of contaminated water streams as well, including treatment of drinking water, and/or treatment of water prior to environmental discharge in systems not recycling water.

Referring to FIG. 1, a fixed quantity of water is continually supplied to and removed from an end use 10, such as a swimming pool, drinking water source, industrial water stream, or any contaminated body of water, from which a stream of water is periodically withdrawn, treated, disinfected, and reused. According to the invention, a stream 12 of air including a substantial fraction of ionized oxygen and nitrogen gas molecules and free electrons, or "plasma", is added to the stream of water from the end use 10 at a venturi eductor 14. The stream 12 of air including ionized gas molecules is provided by an ionized gas source 18 powered by an AC power supply 16. Differing embodiments of the ionized gas source 18 are discussed below in connection with FIGS. 2–5 and 6.

A stream of metal ions from a source 20 is then introduced into the mixed stream of water from end use 10 and air including ionized gas molecules from source 18. In one embodiment, detailed below in connection with FIGS. 7 and 8, the source 20 of metal ions may comprise a pair of charged metallic alloy electrodes 52 exposed directly to the water stream. The electrodes 52 are formed of the metals to be added to the water stream, and are connected to a source 22 of DC potential, the polarity of which is preferably reversed at intervals on the order of one to several minutes. Accordingly, an electric field exists between the electrodes 52, which accordingly behave as sacrificial electrodes, i.e., individual metallic atoms of the electrodes enter the water stream. According to an important aspect of the invention, the ionized metallic atoms from the electrodes 22 chemically react with the ionized gas molecules of the plasma 12, largely in the region between and surrounding the electrodes 52, forming a variety of biocidal disinfectant metal ion compounds, killing various biological agents and organic substances in the water.

For example, electrodes suitable for use in swimming pool and typical environmental and/or industrial water treatment applications may comprise stannous, silver, and copper metals in the relative proportions 5:10:85 respectively by weight. The plasma stream 12 of air including ionized atoms may include various ionized forms of nitrogen, oxygen, ozone, free electrons, and combinations thereof, as discussed further below. The ionized gas atoms of the plasma stream 12 react with the oppositely ionized metal ions from the electrodes to form a number of beneficial water treatment compounds. Included in these are $Sn^{++}C_4H_4O^-{}_6$, a known viricide and fungicide; $Cu^+NO^-{}_3$, a known algicide; and $Ag^+NO^-{}_3$, a known bactericide. Therefore, according to the invention, by combining the water stream to be treated with specific metal ions and an ionized plasma of oxygen and nitrogen gas molecules and electrons, algae, bacteria, viruses, fungi, and other organic contaminants are destroyed in the water stream without addition of undesirable chemicals. Further, as the gas plasma and ions are charged, a strong electrostatic coagulant effect is provided. Disinfection and coagulation according to the invention are accomplished at very high efficiency due to the strong oxidizing and coagulation capability of the ionized oxygen/nitrogen plasma ion gas species. Further, as the disinfectant compounds are formed in situ, that is, in the very water stream to be treated, no additional mechanical processing or handling steps or the like are required, simplifying the apparatus required, while the ionized gas and metal ions have very limited opportunity to recombine or otherwise lose their disinfectant and coagulant efficiency.

After the water stream has been combined with the plasma stream at 14 in close proximity to the electrode sources of metal ions at 20, the water stream may be stored in a reactor tank 24 if necessary to provide sufficient retention time for the final disinfectant reactions to be completed. Typically, reactor tank 24 would only be used in certain industrial and environmental water treatment applications and will not be necessary in a swimming pool water recycling and disinfecting system or the like. The water stream is then filtered as indicated at 26 to remove the killed organics as well as any coagulated particulates or the like from the water stream, after which the water stream may be returned to the end use 10. A pump 28 may be provided to motivate water through the system as needed.

In a specific example, in order to retrofit a disinfectant system according to the invention in place of the chlorination plant of a conventional swimming pool or drinking water treatment system, the chlorination plant is simply replaced with a venturi eductor device 14, at which the plasma stream 12 is mixed with the water stream, and a sacrificial electrode metal ion addition unit 20, at which the metallic ions are added to the water stream. The replacement process is quite straightforward and readily accomplished.

In this connection, it will be appreciated that adding the plasma stream 12 at the venturi eductor 14 is highly useful in that the conduit 29 carrying the plasma stream 12 can be connected to the venturi just after the point of minimum cross-sectional area, such that the plasma stream will be exposed to a partial vacuum. See FIG. 7. Accordingly, the ionized plasma gas stream will be drawn into and mixed thoroughly with the water stream without necessity of an additional pump or the like, simplifying and reducing the cost of the system and rendering its retrofit to preexisting swimming pool disinfectant systems, and other types of environmental water treatment applications, very convenient.

FIGS. 2–5 show a first embodiment of an ionized gas source 18 suitable for use in systems having relatively small to moderate water treatment demand. FIGS. 2–4 illustrate the physical embodiment of the device, and FIG. 5 shows typical power supply connections. As indicated above, the basic components of the ionized gas source 18 are means for confining a quantity of atmospheric air in a reaction zone in which the air is exposed to radiation from a suitable ultraviolet lamp while simultaneously experiencing one or both of electric and magnetic fields, in order to ionize the highest possible percentage of the oxygen and nitrogen atoms in the passing airflow.

In the FIGS. 2–5 embodiment, a stream of air is drawn into a sealed boxlike container 30 through air intake openings 32 in its lid fitted with glass wool or other air cleaning filters 34, such that an air flow path is established from the air intakes 32, through an exposure zone in the box 30, to an exit tube 44 connected by conduit 29 (FIG. 7) to the venturi eductor 14. Within the box 30 are disposed one or more "low pressure" mercury vapor ultraviolet lamps 36 each surrounded by a multi-wire strip or "ribbon" (as shown) or a spiral coil 42 providing electric and magnetic fields to energize the atoms of the air in the vicinity of the lamp. As is well known, such lamps emit ionizing ultraviolet radiation in the 184 and 254 nm wavelength bands, as well as emitting additional wide bandwidth infrared radiation. The ultraviolet radiation is particularly suitable for ionizing oxygen in the air and some fraction of the nitrogen, while the infrared radiation may additionally ionize nitrogen. In the embodiment shown, each lamp 36 is surrounded by an axial multi-wire ribbon 42 typically comprising a number of parallel conductors (see FIG. 5), which when energized provide a longitudinal electric and/or magnetic field in the vicinity of the corresponding ionizing lamp 36.

As shown in FIG. 4, each ultraviolet lamp 36 may be disposed within a hollow plastic cylindrical support tube 38, drilled with holes 40 to allow ready passage of air. An axial multi-wire ribbon 42 is assembled over the tube 38 and comprises one or more conductors for carrying a current and thereby emitting an elongated electric and/or magnetic field in the vicinity of the lamp 36. For example, in the embodiment of FIGS. 4 and 5, the multi-wire ribbon 42 may comprise a number of parallel thin (e.g. 22 gauge) stainless steel wires, spaced from one another by insulative plastic material woven into a flat ribbon, so that a moderately large current can be passed from one end of the ribbon to the other. When the lamp 36 is energized and electrical power is supplied to the wires of the ribbon 42, atmospheric air passing through the ribbon 42 is subjected to relatively intense radiation from the lamp, including both short wavelength ultraviolet and infrared radiation, and also to an electric and/or magnetic field due to current flowing in the conductors of the ribbon. The proportions of electric and magnetic field strength are generally responsive to the exact configuration and number of wires of the ribbon. As noted, the longitudinal conductors of the ribbon can be combined with or replaced by a helical conductor wound on tubes 38 and providing a solenoidal field. The flow rate of air through the exposure zone defined by container 30 is controlled such that the average residence time of atmospheric air passing in the vicinity of the lamp and coil combinations is on the order of several minutes. A substantial fraction of the oxygen and nitrogen molecules of the air in the vicinity of the assembly of the lamp and ribbon and/or coil are ionized under these conditions.

FIG. 5 shows a schematic diagram of a typical lamp and ribbon power supply circuit suitable for practice of the invention. As indicated, AC power is supplied at line connection 16 and the multi-wire ribbon 42 is in series with the lamp power supply 64. Power supply 64 preferably comprises a solid state power supply providing pulsating "bursts" of current to lamp 36; pulsing the current results in shorter and more intense UV energy being produced below 180 nm, at wavelengths as short as 160 nm. In the embodiment of the invention shown by FIGS. 2–4, up to four twelve-inch 20 watt low pressure mercury vapor lamps may be provided, each powered by an individual power supply. Each lamp power supply provides pulsating electrical power that averages 90 volts at 250 milliamps. While 60 Hz current can be supplied directly to the lamps, significantly more radiation is emitted if much higher frequency (20,000–50,000 Hz) AC is supplied to the lamp filament. Further preferably, the voltage and current are both controlled to periodically exceed their average values by at least about 30%. More particularly, the high frequency power supplied may be modulated by a superimposed signal, such that the maximum amplitude of the high frequency signal is varied at a much lower frequency. For example, the usual 60 Hz line power can be used as the modulating signal. In this case, the amplitude of the high frequency signal will be varied between 0 and 100% of its maximum value 120 times per second.

Other rates and waveforms of the modulating signal are within the scope of the invention. For example, if the power supplied to the lamp is pulsed between 70 and 100% of its maximum value, the lamp filaments never cool fully but remain hot, such that a substantial fraction of energy is UV photon burst energy of less than 180 nm wavelength. Such low pressure mercury vapor lamps are further stimulated by such pulsating current to emit a substantial fraction of increased short wavelength ultraviolet energy in the 160–185 nm range, with further components in the 250–265 nm range, and with additional wide bandwidth infrared energy as well. As noted above, it is generally understood that ultraviolet radiation effectively stimulates ionization of oxygen, and nitrogen to a lesser degree, while infrared radiation further stimulates ionization of nitrogen. Furthermore, exposure of atmospheric oxygen to radiation and electric and magnetic fields increases and intensifies the normal paramagnetism of the oxygen molecules, increasing the chemical activity thereof, particularly while disposed in the electric field between the charged metal ion electrodes 52.

Without intending to limit the scope of the claims appended hereto to any particular theory of operation, it is believed that a number of distinct ionic species are produced in the plasma gas source 18, each of which may contribute separately and beneficially to water treatment by oxidation and coagulation of contaminants, further resulting in disinfection as provided by the system of the invention. In a first reaction, nitrogen molecules are understood to be ionized and energized by ultraviolet and infrared radiation, and are further energized by the surrounding electric and magnetic fields, to generate ionized nitrogen and release a free electron according to the following equation:

$$[N\equiv N]\leftrightharpoons N\equiv N^{+}+e^{-}$$

The ionized nitrogen gas thus provided assists in coagulation of waterborne contaminant debris and particles, if any are present; equally important, this reaction releases an additional free electron ($e^-$) which may further assist in a variety of oxygen gas generation and ionization reactions.

A further reaction which is thought to occur is the generation of singlet molecular oxygen ($O_2^{\alpha-}$) according to the following equation:

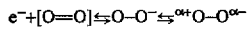

Those of skill in the art will recognize that this equation indicates that oxygen ions ($O_2^-$) as well as partially negatively charged dipoles ($O_2^{\alpha-}$), that is, singlet molecular oxygen, and free electrons, are formed in the presence of pulsating ultraviolet radiation and the electric and magnetic fields provided according to the invention. The negatively charged oxygen ions and partially charged singlet molecular oxygen stimulate coagulation, oxidation, and/or carboxylation of any particulate debris or contaminants present, and may oxidize and destruct various contaminant species for removal, including the oxidation and destruction of bacteria and virus.

As mentioned, the oxygen and nitrogen ions react with the stream of metallic species added by the electrode unit 20 as discussed above to form additional specific chemical disinfectant molecules.

Test results demonstrating the generation of singlet molecular oxygen by apparatus generally as described herein, and the efficiency of singlet molecular oxygen in water purification according to the invention, are provided in Appendix I, attached hereto and forming a part of this application. Further test results are available which demonstrate the generation of highly reactive species of paramagnetic molecular oxygen.

As the ionized oxygen molecules collide with one another, ozone ($O_3$) is also formed in the plasma. Ozone is known to be highly reactive and destructive to organic molecules, as discussed in applicant's prior patents referred to above. Further, polar combinations of two oxygen atoms with one nitrogen atom are also formed, and are also useful in contributing to the molecular destruction of organic contaminants. Pulsating the lamp current, providing additional UV photon energy in the 160 to 180 nm range, also results in the production of more highly paramagnetic oxygen ions.

It can thus be seen that stimulation of the molecules of the atmospheric air by simultaneous exposure to ultraviolet and infrared radiation of a variety of wavelengths and to electric and/or magnetic field energy promotes the formation of various reactive species of both nitrogen and oxygen ions, which in turn make a direct contribution to purification of water streams according to the invention, and also react with one another and with metallic ions, as discussed further below, to provide an additional disinfectant water treatment effect. The free electrons released by ionization of the nitrogen molecules further tend to stimulate higher ionized states of plasma ion oxygen.

The additional chemical disinfectant compounds which are desirably formed include, but are not limited to, the known bactericide $Ag^+NO_3^-$, $Cu^+NO_3^-$, known to be algicidal, and the known fungicide and viricide $Sn^{++}C_4H_4O^-_{-6}$. These compounds may be formed in situ by disposing metallic electrodes 52 of copper, silver, and stannous materials in the proportions desired in the water stream, as indicated in FIG. 7, and supplying suitable power thereto. Power supply 22 applies DC power, typically 12 volts at one ampere, across the two electrodes, while the mixed stream of ionized gas and water to be disinfected flows therebetween. An electric field thus exists between the charged electrodes 52; and the electrodes 52 are sacrificial in that over time their materials erode away, giving up individual metallic atoms to the water stream. These atoms will be ionized, depending on the charge applied, and will combine with the nitrogen and oxygen ions in the water stream, having been introduced at inlet 50, to form the disinfectant compounds mentioned above in situ. However, it is to be understood that other compounds might also be formed, and that the electrodes may include other metals. Further, it is not necessary to the utility of the invention that the disinfectant compounds be formed in precise proportions or the like.

More specifically, and as set forth more fully in copending Ser. No. 08/627,278 (Attorney's Docket DJ-10) the metals of the electrodes may also include manganese, so that the permanganate ion ($MnO_4^-$) is formed. Electrodes of 80 weight % Mn, balance silver are useful. Up to 10.0 weight % silica may also be added to the melt of the electrode metals prior to casting. The addition of silica allows the molten metals to mix more readily, easing casting, has a catalyst effect in that it appears to aid in more uniform sacrificial loss of the electrode materials in use, and appears to render the disinfection process more efficient. As little as 0.25–1.0 weight % silica is useful in easing the casting process, depending on the other materials in the melt.

As indicated in FIG. 7, the stream of air including plasma, again, a variety of ionized gas atoms and free electrons, is introduced by conduit 29 into the water stream at 50, just downstream of the throat of venturi 14. The advantage of so doing is that the gas stream experiences a reduced pressure, i.e., a partial vacuum, and hence will be drawn into and mixed with the water stream, establishing an air flow path from the air intake 32 (FIG. 2) through the exposure zone to the venturi 14.

In one convenient method of supporting the sacrificial electrodes 52 in the water stream, the electrodes are mechanically fastened to a PVC plastic pipe cap 51 threaded into a tee fitting 53 interposed in the line (see FIG. 8).

Preferably, the polarity of the DC potential applied to electrodes 52 is reversed at intervals, e.g. on the order of one to two minutes, so that the rate of sacrifice is even; if the DC polarity were not periodically reversed, one electrode would erode much faster than the other. The shape of the electrodes, as illustrated in FIGS. 7 and 8, wherein a generally semi-circular notch 52a is formed at the free end of each of the two electrodes 52 in the water stream, is also significant; it has been found that provision of the notches 52a tends to equalize the rate of sacrificial erosion of the electrode material along the length of the electrodes, particularly when at least 0.25–1 weight % silica is added. In a prior design, wherein the electrodes were square-ended, and no silica was added, the electrode materials tended to be sacrificially eroded from the tips of the electrodes much more quickly than near their support ends, so that they became tapered over time.

Figure 10:
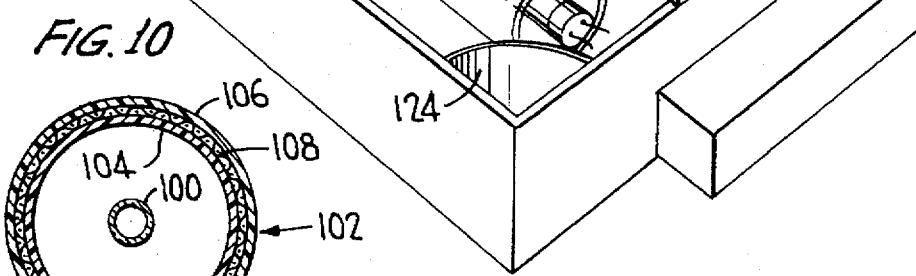
Figure 11:
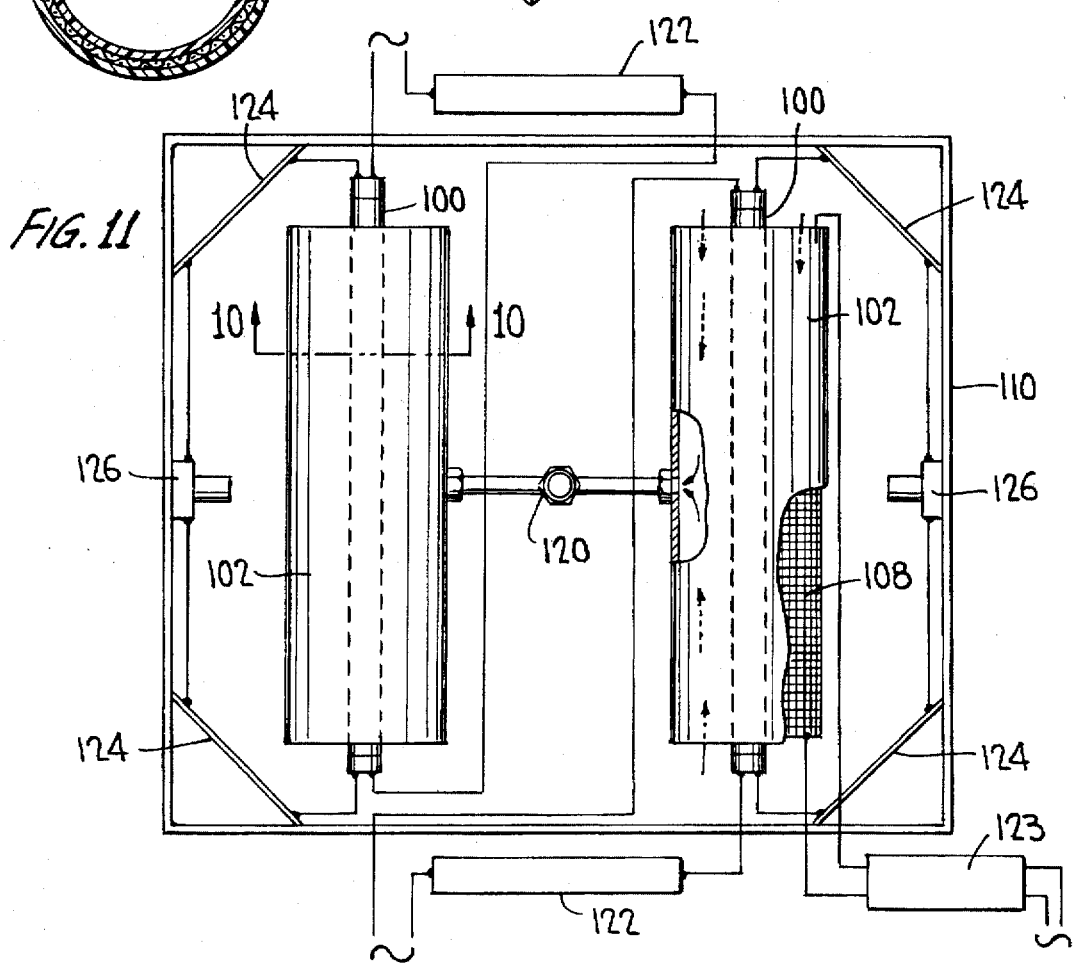

FIGS. 9–11 show a further embodiment for producing an ionized gas plasma. In this embodiment, two ultraviolet lamps 100 are provided, each within tubular duct members 102 which may serve additional functions, depending on their exact structure. In the embodiment shown, as illustrated by the cross-sectional view of FIG. 10, the ultraviolet lamp 100 is in the center of the cylindrical duct assembly 102. In this embodiment, the duct assembly comprises an inner plastic tube 104 and an outer plastic tube 106. Supported therebetween is a member 108 for applying a magnetic field within the duct 102. As described above in connection with FIG. 4, this member 108 may comprise a multi-wire ribbon consisting of a number of parallel wires spaced from one another by woven plastic web material, as shown in partial cutaway view in FIG. 11. The wires of this material can then be connected in parallel to one another across a power supply for applying an appropriate magnetic field, all as discussed generally above. A spiral wound wire coil may also or additionally be disposed between inner and outer tubes 104, 106 and connected to a suitable power supply for providing a solenoidal magnetic field. The combination of the strip ribbon and the solenoid wire wound coil affords an intense magnetic field to stimulate the ionizing of atoms in the gas stream.

In the embodiment of FIG. 9, air enters a sealed container 110 through one or more inlet openings 112 provided with filter material 114, as indicated by arrow 116. The air is removed from the container 110 via an outlet tube 118 which is connected by a tee fitting 120 to the interior of the duct members 102, as shown in FIG. 11. Outlet tube 118 is connected to a venturi eductor or the like for drawing vacuum, as above, so as to draw ambient air through the inlet 112 and the duct members 102, and out through the tee fitting 120. While the air within duct members 102 is exposed to the ultraviolet lamps 100, a substantial fraction of the gas atoms thereof are ionized; specifically, ionized oxygen atoms and molecules, including singlet molecular oxygen, ionized nitrogen, and ozone are formed by exposure to UV, and, if provided, to a magnetic field.

The lamps 100 are supplied with power by suitable power supplies 122. The power supplies 122 are connected in series with the filaments of the lamps as shown, and are also in series with metal plates 124, disposed in each corner of container 110. The plates 124 can be straight as shown in FIG. 11, or curved as shown in FIG. 9. The effect of connecting plates 124 in series with the power supplies as shown is that airborne dust tends to be attracted to the charged plates 124. The dust is thus prevented from settling on the lamps and attenuating the radiation emitted thereby.

As also shown schematically in FIG. 11, conventional fluorescent lamp starters 126 are also in series with the ultraviolet lamps 110 and power supplies 122. While conventional starters as depicted are functional, modern solid state starters are a better choice for reasons of economy.

In the preferred embodiment, power supplies 122 provide high frequency AC power to the lamps, e.g., between about 20,000–50,000 Hz, 500–1500 ma, and 50–150 V. The current may simultaneously be pulsated at a much lower frequency, as discussed. Use of these very high frequency pulsed power supplies provides substantial additional ultraviolet radiation at a relatively small cost in lamp life, with no additional energy costs. A particularly useful combination of power characteristics is 80 V, 800 ma, and 40,000–45,000 Hz. Lamps 100 may be those sold as 30 watt ultraviolet ionizing lamps. It will be apparent that the power applied thereto according to this aspect of the invention is well over 30 watts, which of course is the reason for the somewhat reduced lamp life. However, in view of the very significant additional energy output by the lamps (estimated to be 30–50% higher), it is in fact good economic sense to operate at the higher voltage, current, and frequency mentioned. The same improvements in lamp power supply, particularly the use of very high frequency pulsated AC, can be employed in connection with the other embodiments of plasma gas generators discussed herein. Ionization of nitrogen in particular is increased by pulsation of the UV lamp power supplies, particularly when a magnetic field is also applied.

In the event it is desired to apply a magnetic field to the gas in ducts 102 by way of supplying power to the parallel wires in insulative mesh 108 and/or to solenoidal wire coils wrapped around ducts 102, here 115 V AC is suitable. A separate power supply 123 is of course required for this purpose. Magnetic fields of up to 25,000–100,000 gauss may thus be generated. As the magnetic field is increased, the percentage of the gas atoms ionized increases similarly.

In a further alternative, the inside surfaces of the duct members 102 may be mirrored to reflect the ultraviolet radiation into the air until it is fully absorbed, thus increasing the efficiency of ionization due to complete utilization of the ultraviolet radiation. The mirroring can be a metallic coating provided on the interior of the tubes 102, a thin sheet of stainless steel or other reflective sheet metal formed into a tube, and disposed within a plastic tube 102, or stainless steel tubing or the equivalent provided as duct member 102. Each of these alternatives is considered to be within the scope of the invention.

Figure 12:
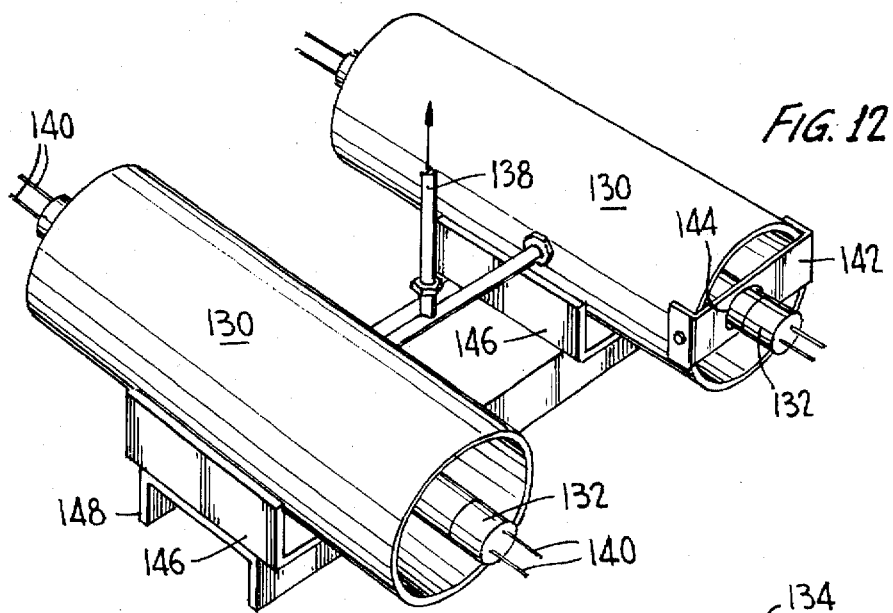
Figure 13:
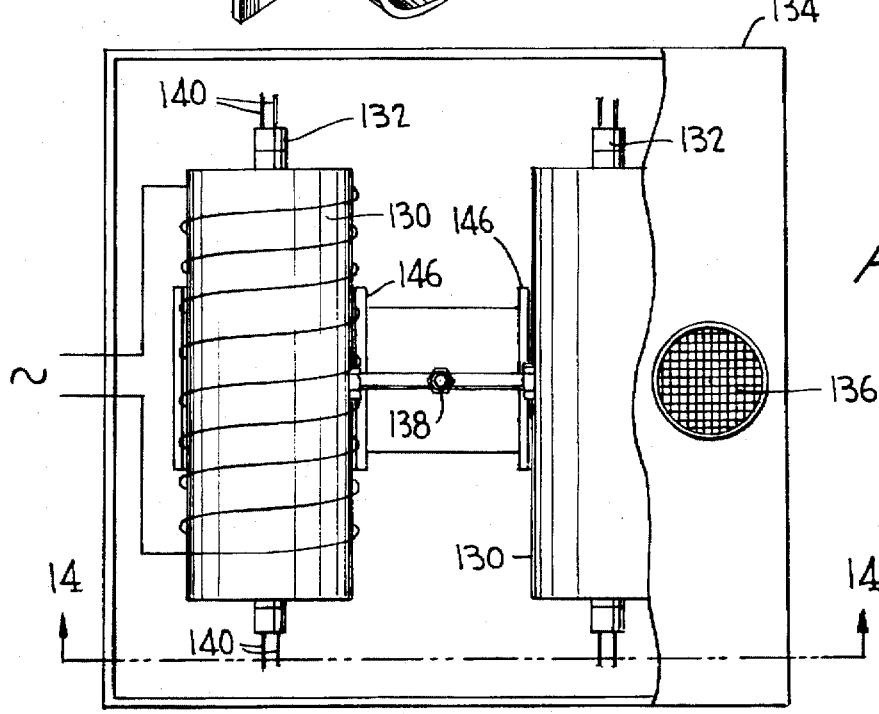
Figure 14:
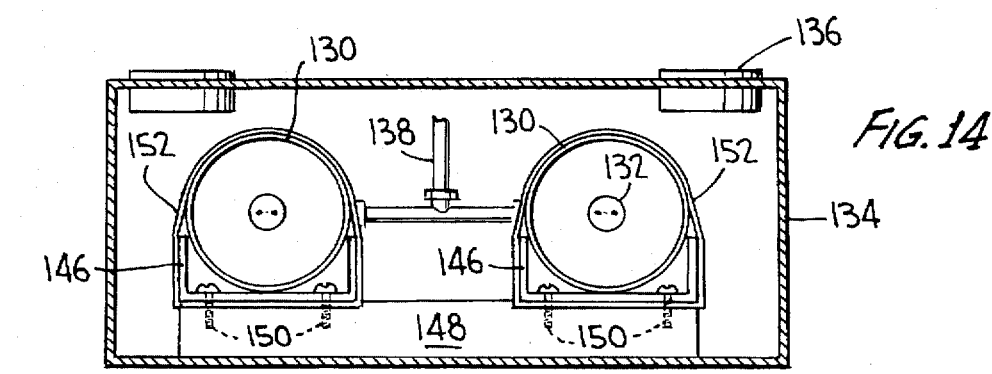

FIGS. 12–14 show a further embodiment of the invention and several alternatives thereof. In particular, FIGS. 12–14 show a particularly convenient method of mounting the duct members 130 which surround respective ultraviolet lamps 132. As above, duct members 130 may be clear plastic tubes, may have mirrored surfaces, and may also support coils indicated at 141, for applying a magnetic field to air within the ducts 130. The lamps 132 are concentric within their respective ducts 130, and the entire assembly is disposed within a container 134, generally as discussed above. Air entering container 134 through an air inlet 136 and exiting through an exit tube 138 connected to the interiors of the tubes 130 is constrained to flow through duct members 130. More specifically, the air is constrained to remain in the duct members 130 for a period of time (e.g., 30–120 seconds) sufficient that substantial numbers of ions of atomic and molecular oxygen, ionized nitrogen, and ozone, as above, are formed. Power supplies as above are provided to drive the lamps and energize the coils.

The ultraviolet lamps 132 are conventionally supplied with four stainless steel spring wire connectors 140; two connectors are in series with each of two filaments, one filament at either end of each lamp. These spring connector members 140 are normally sufficiently durable that they can serve as the entire support of the lamps 142. Alternatively, a metallic bracket 142 having a hole 144 therein for receiving insulative terminations of each end of lamps 132 can be secured to the end of the cylindrical duct 130 as indicated in FIG. 12, to provide a more positive support for lamps 132. If used, brackets 142 would be provided at each end of each lamp.

The cylindrical ducts 130 may be conveniently supported within the container 134 as shown. Short sections 146 of fiberglass channel section material, which is commercially available and relatively inexpensive, securely cradle each duct 130, and are secured to a longer section of the same material 148 by sheet metal screws 150 or the like. Ducts 130 can be secured to the short sections 146 of the channel material by flexible plastic members having integral buckle members 152, e.g., those commonly sold as "Zip-ties" for securing electrical wires and the like. The embodiment of the invention shown in FIGS. 12–14 can thus be assembled with essentially no custom parts whatsoever, and using only very simple tools, and is therefore admirably suited for low-cost implementation of the invention, broadening its applicability to all sorts of water streams requiring disinfection according to the invention.

It will be appreciated by those of skill in the art that in many circumstances it is desirable to control the rate of addition of chemical species to a reaction such that the reaction is stoichiometric, or nearly so. However, stoichiometry is not necessary in the present reaction. The rate of addition of ionized gas atoms in the plasma is estimated to be typically one hundred times the stoichiometric rate at which the metal atoms of the electrodes are eroded away. The rate of supply of addition of ionized gas is proportional to the power supplied to the lamp power supplies and coils, while the rate of erosion of the metallic sacrificial electrodes 52 is proportional to the rate of supply of current to the electrodes. These rates may be controlled responsive to the composition and amount of pollutants to be removed from the water stream. Typical gas flow rates in a small to moderate demand installation may be one to five CFM, while electrodes weighing on the order of 0.5–1 kg each may last six months to a year if 12 VDC is supplied at not more than one ampere.

Where a greater quantity of water is to be disinfected and treated, a further embodiment of the ionized gas source 18 according to the invention may be employed. An example of this embodiment of this element of the invention shown in FIG. 6 includes two thirty-six-inch 50 watt low pressure mercury vapor ultraviolet lamps 66; lamps 66 and the associated components may be multiplied according to the total water treatment and disinfectant demand. Each lamp 66 is located inside a plastic tube 68 sealed at one end 70 and open at the other, to create an air intake 71 which will typically be provided with a filter 73. Within each plastic tube 68 is a carbon steel tube 72 which serves to support a solenoidal coil 74 of wire helically wrapped once along the length of tube 72 parallel to the axis of the UV lamp 66. Accordingly, as indicated in connection with the embodiment of the reactor shown in FIGS. 2–4, the UV lamp 66 is surrounded by a solenoidal coil 74 providing an electric and/or magnetic field in the vicinity of the lamp. Preferably each coil is in series with a corresponding solid state lamp power supply 75, as indicated. 50 watt lamp power supplies providing pulsating current averaging 180 VAC at 750 milliamps may be used; as above, preferably high-frequency AC power is provided, and pulsated such that the voltage and current both periodically increase by at least 30% from their average values. The plastic tubes 68 are typically 2½" OD, to receive the carbon steel tubes 72, having the solenoid coils 74 wrapped therearound, with the UV lamps 66 within the carbon steel tubes 72 such that an exposure zone is defined within each tube. The upper outlet of each plastic tube 68 is connected to venturi 14 (FIG. 1), such that an air stream is drawn along an air flow path from the lower ends of the tubes. Air in the exposure zone is subjected to UV radiation and substantial magnetic and electric fields for a residence time determined by the flow rate of the air through the tubes. As above, the residence time of the air in the exposure zone defined by the interior of the tubes 72 is preferably on the order of 1–2 minutes.

As noted, in each of the embodiments of the lamps and power supplies, under certain circumstances, the lamp current can be conveniently pulsed, providing ignition current to the lamp filaments and generating increased ionizing energy from the lamp. In particular, where the heater filaments 63 provided at either end of conventional low pressure ultraviolet lamps 36 (see FIG. 5) are located within the magnetic field provided by the corresponding coil, the lamp may be extinguished regularly, e.g. corresponding to the 60 Hz line frequency. This has the effect of causing the heater filaments 63 to be pulsed repetitively and rapidly, and accordingly to emit a greater proportion of ionizing radiation in the ultraviolet range of 160 to 180 nm wavelength, as well as more infrared, than if the lamp 36 were steadily lit. As noted above, such short-wavelength UV ionizes oxygen very effectively, while infrared radiation can be particularly useful in ionizing nitrogen. As the nitrogen is ionized, free electrons are produced which may further assist in oxygen gas ionization. Accordingly, there may be water streams with higher contamination levels wherein the specific configuration of the lamp and coil combination can desirably be configured to pulse the lamp current, optimizing both oxygen and nitrogen gas ion production.

The scaling of the components of the system to suit the amount of water to be processed and the amount of water treatment and disinfection needed thereby responsive to the particular process treatment required is within the skill of the art. In a relatively small system, two of the twelve-inch, 20 watt lamps of the FIGS. 2–4 embodiment may be provided in container 30, supplying the ionized gas plasma thus produced to a single venturi, just upstream of a single pair of electrodes. In a system requiring more treatment and disinfection, four of the 20 watt lamps of the FIGS. 2–4 embodiment may be provided in a single container 30, and their output split between two venturis and two pairs of electrodes. The units of FIGS. 9–11 may likewise by multiplied as desirable responsive to the water stream to be processed. In an industrial or larger environmental system requiring still higher levels of water treatment and disinfection, a pair of the much larger 50 watt lamps as shown in FIG. 6 may be employed, and the plasma produced thereby split between two venturis feeding two pairs of metallic sacrificial electrodes. Other modifications are, of course, within the skill of the art.

While a number of preferred embodiments of the invention and alternative configurations thereof have been disclosed, these are not intended to be limiting of the invention, but merely as exemplary thereof. The invention is to be limited only by the following claims.

What is claimed is:

1. A method for removing pollutants, impurities, organics, and other undesirable components from a water stream, comprising the steps of:

defining a stream of atmospheric air;

passing said stream of atmospheric air through an exposure zone including a source of ultraviolet radiation including components between 160–185 and 250–265 nm wavelength, said air stream in said exposure zone passing through the interior of conductive coil means connected to power supply means for emitting one or both of electric and magnetic fields, whereby a stream of air including a substantial fraction of ionized gas molecules is generated;

introducing said stream of air including ionized gas molecules to said water stream;

providing a stream of ions of elements which, when chemically combined with the ions of said stream of ionized gas molecules, form compounds having one or more of bactericidal, viricidal, algicidal and fungicidal disinfection properties;

mixing said water stream, having had said stream of air including ionized gas molecules introduced thereinto, with said stream of ions of elements, under conditions such that one or more of said compounds are formed in situ, and such that one or more of bacteria, viruses, algae, and fungi in said water stream are killed; and filtering said water stream after said mixing step, to remove said killed bacteria, viruses, algae, and fungi therefrom.

2. The method of claim 1, wherein said water stream is mixed with said stream of ions of elements by exposing said water stream to charged metallic sacrificial electrodes formed of said elements.

3. The method of claim 2, wherein said sacrificial electrodes comprise two or more of stannous, silver, manganese, and copper metals, in proportions selected responsive to the undesired components of the water stream.

4. The method of claim 3, wherein the stannous, silver, and copper metals of said electrodes are provided in the approximate proportions of 5:10:85 respectively by weight.

5. The method of claim 3, where between about 0.25–10 weight % silica is added to the metals of said electrodes.

6. The method of claim 3, wherein the ionized gas molecules formed include one or more of $O_2^-$, $N_2^+$, $O_2$, and $O_3$ ions, whereby one or more of $Cu^+NO_3^-$ algicide, $Ag^+NO_3^-$ bactericide and $Sn^{++}C_4H_4O_6^-$ fungicide and viricide disinfectant compounds are formed.

7. The method of claim 2, wherein at least two said electrodes are provided, and a DC potential, the polarity of which is reversed at intervals, is applied across said electrodes.

8. The method of claim 7, wherein current at approximately one ampere and 12 VDC is applied across said electrodes, and comprising the further step of reversing the polarity of said current at intervals on the order of two minutes.

9. The method of claim 1, wherein said water stream is passed through a venturi, producing a reduced pressure point downstream thereof, and said stream of air including ionized gas molecules is introduced at or near said reduced pressure point.

10. The method of claim 1, wherein said stream of air is further exposed to infrared radiation in said exposure zone.

11. The method of claim 10, wherein both said ultraviolet and said infrared radiation are generated by an ultraviolet lamp, powered by a power supply applying AC to said ultraviolet lamp, and said method further comprising the step of ducting air so as to remain in the vicinity of said lamp for exposure to said ultraviolet radiation for at least a predetermined average exposure time.

12. The method of claim 11, wherein said power supply supplies AC current at 20,000–50,000 Hz.

13. The method of claim 11, wherein said AC power applied to said lamp is further pulsated at a relatively low frequency.

14. The method of claim 1, wherein said air being exposed to ultraviolet radiation is further exposed to one or both of electric and magnetic fields by application of a suitable alternating-current drive signal to said conductive coil means, said coil means substantially enclosing one or more elongated lamps emitting said radiation.

15. The method of claim 14, wherein said conductive coil means comprises a helical coil wrapped lengthwise about a metallic tube enclosing each said elongated lamp.

16. The method of claim 14, wherein said conductive coil means comprises a number of spaced metallic wires extending lengthwise along each said elongated lamp.

17. A method for disinfecting a water stream, comprising the steps of:

providing a container having an inlet for inlet of air and an outlet for outlet of air, otherwise being sealed, and having an ultraviolet lamp driven at 50–150 V, 500–1500 ma and 20,000–50,000 Hz mounted therein;

drawing a stream of atmospheric air into said container through said inlet for exposure to ultraviolet radiation from said lamp, such that a fraction of oxygen and nitrogen molecules of said air stream are ionized; and mixing said stream of air with said ionized oxygen and nitrogen molecules therein with said water stream;

wherein metallic plates are disposed within said container and connected in series between a power supply driving said lamp and filaments of said lamp, such that said metallic plates attract dust therefrom within said sealed container.

18. The method of claim 17, wherein said power supply means for supplying power to said lamp provides pulsed power.

* * * * *